H. W. WALKER.
AIR PRESSURE INDICATOR.
APPLICATION FILED MAY 31, 1910.

988,917.

Patented Apr. 4, 1911.

Witnesses
E. Larson
Charles A. Wilson

Inventor
H. W. Walker
By Peeler & Cobb
Attorneys

THE NORRIS PETERS CO., WASHINGTON, D. C.

UNITED STATES PATENT OFFICE.

HENRY W. WALKER, OF SYRACUSE, NEW YORK, ASSIGNOR TO JOHN W. LEE, JR., OF SYRACUSE, NEW YORK.

AIR-PRESSURE INDICATOR.

988,917.      Specification of Letters Patent.      Patented Apr. 4, 1911.

Application filed May 31, 1910. Serial No. 564,265.

*To all whom it may concern:*

Be it known that I, HENRY W. WALKER, a citizen of the United States, residing at Syracuse, in the county of Onondaga and State of New York, have invented certain new and useful Improvements in Air-Pressure Indicators, of which the following is a specification.

This invention relates to air pressure indicators adapted particularly to measure the pressure in pneumatic tires.

It contemplates the construction of a device of this nature which may readily be attached to a tire nipple without the use of threads and the like, and which will have a separate pump connection adapted for use as desired.

With the above and other objects in view, this invention consists in the construction, combination, and arrangement of parts, all as hereinafter more fully described, claimed, and illustrated in the accompanying drawings, wherein—

Figure 1:
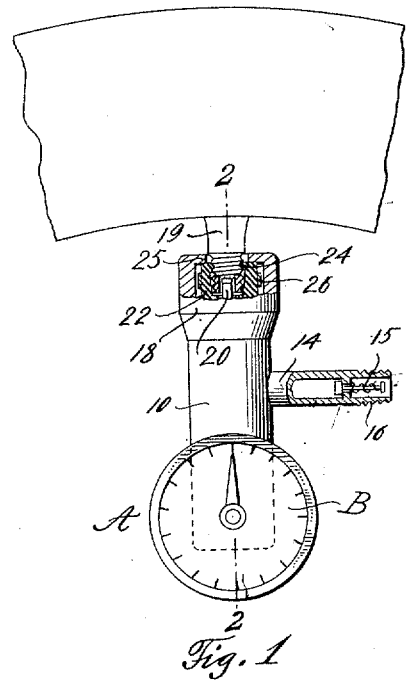
Figure 2:
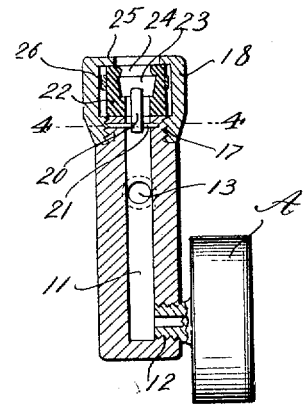
Figure 3:
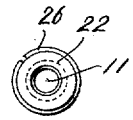
Figure 4:
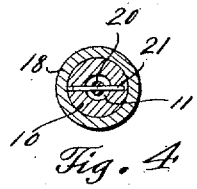

Figure 1 is a front elevation of a device constructed in accordance with the present invention, illustrating the same applied and parts thereof broken away; Fig. 2 is a section taken along the line 2—2 of Fig. 1, illustrating the same removed from a tire and the dial in elevation; Fig. 3 is a top plan view of the rubber gasket forming the air tight attaching means; Fig. 4 is a section taken through the body portion of the present invention along the line 4—4 of Fig. 2.

Referring more particularly to the drawings 10 indicates a cylindrical body portion having a passage 11 extending longitudinally therethrough, said passage having at its lower terminal a transverse opening 12 in which is secured the pressure indicator A which is of any suitable construction. Midway of the longitudinal dimension of the body portion and at right angles to the opening 12 is a similar opening 13 in which is secured a tubular member 14, said tubular member having a pressure valve 15 mounted therein and the threads 16 at its outer terminal. This tubular member 14 is adapted to be secured to the pump hose by the threads 16 so that the pressure of air passing into the tire through the body portion 10 will be indicated on the dial B of the indicator or gage A. The upper terminal of the body portion is provided with a reduced, exteriorly threaded, extension 17 to which is detachably secured the enlarged collar 18. In order to provide a means whereby the valve of the tire nipple 19 may be opened a pin 20 of smaller diameter than the passage 11 is mounted in the reduced extension 17 through the instrumentality of the transverse pivot 21.

The collar 18 has mounted therein the rubber gasket 22 which is cylindrical in formation and is provided with the approximately conical formed opening 23, about the upper edge of which is an inwardly extending flange 24 which bears against the flange 25 formed about the upper edge of the collar. A spring band 26 surrounds the gasket 22 to insure the firm contact of the flange 24 with the threads of the tire nipple 19.

From this construction it will readily be seen that the tire nipple is inserted in the opening 23 and has the threads thereof securely engaged by the flange 24 of the gasket 22. At the same time the pin 20 opens the valve of the tire nipple 19 and permits the air in the tire to pass into the passage 11 and register the pressure in the tire upon the dial B of the indictator A. Should it be desired to inject air into the tire the pump hose is mounted on the threads 16 of the tubular member 14 and air from the pump passes through the passage 11, at the same time registering the increased pressure on the dial B. When it is desired to remove the attachment the only operation necessary is to exert a pull thereon which will cause the flange 24 of the gasket 22 to release the nipple.

Having thus described my invention, what is claimed as new is:

1. In an attachment of the class described, comprising in combination a cylindrical body portion having a longitudinal passage therein and the upper extremity thereof reduced and exteriorly threaded, an enlarged collar adapted to be received on the exteriorly threaded reduced portion, said collar having the outer edge thereof flanged inwardly, a cylindrical gasket mounted in said collar having an inwardly extending flange about its upper edge, a means pivotally mounted in said reduced portion adapted to open the valve of a tire, and means carried by said cylindrical body portion whereby pressure may be indicated.

2. In an attachment of the class described, comprising in combination a cylindrical body portion having an exteriorly threaded reduced portion at its upper terminal, an enlarged tubular collar adapted to be secured on said exteriorly threaded reduced portion having an inwardly extending flange about its upper terminal, a tubular receiving gasket adapted to be received in said collar likewise having an inwardly extending flange about its upper edge said gasket being retained in position by the flange of said collar, a resilient band adapted to surround said gasket causing the flange thereof to engage the nipple of a tire, a pin loosely pivoted to the reduced portion of said body portion adapted to open the flange of a tire, and an indicator carried by said body portion.

3. In an attachment of the class described, comprising in combination a cylindrical body portion having a longitudinal passage therein and the upper extremity thereof reduced and exteriorly threaded, an enlarged collar adapted to be received on said exteriorly threaded reduced portion, said collar having the outer edges thereof flanged inwardly, a cylindrical gasket mounted in said collar having an inwardly extending flange about its upper edge, and a means pivotally mounted in said reduced portion adapted to open the valve of a tire.

In testimony whereof I affix my signature in presence of two witnesses.

HENRY W. WALKER.

Witnesses:
J. D. GERL,
WM. WITTNEBEN.

---

Copies of this patent may be obtained for five cents each, by addressing the "Commissioner of Patents, Washington, D. C."